Nov. 13, 1962 W. R. MARSHALL 3,063,091
METHOD AND APPARATUS FOR MILLING PLASTIC MATERIAL
Filed July 5, 1960
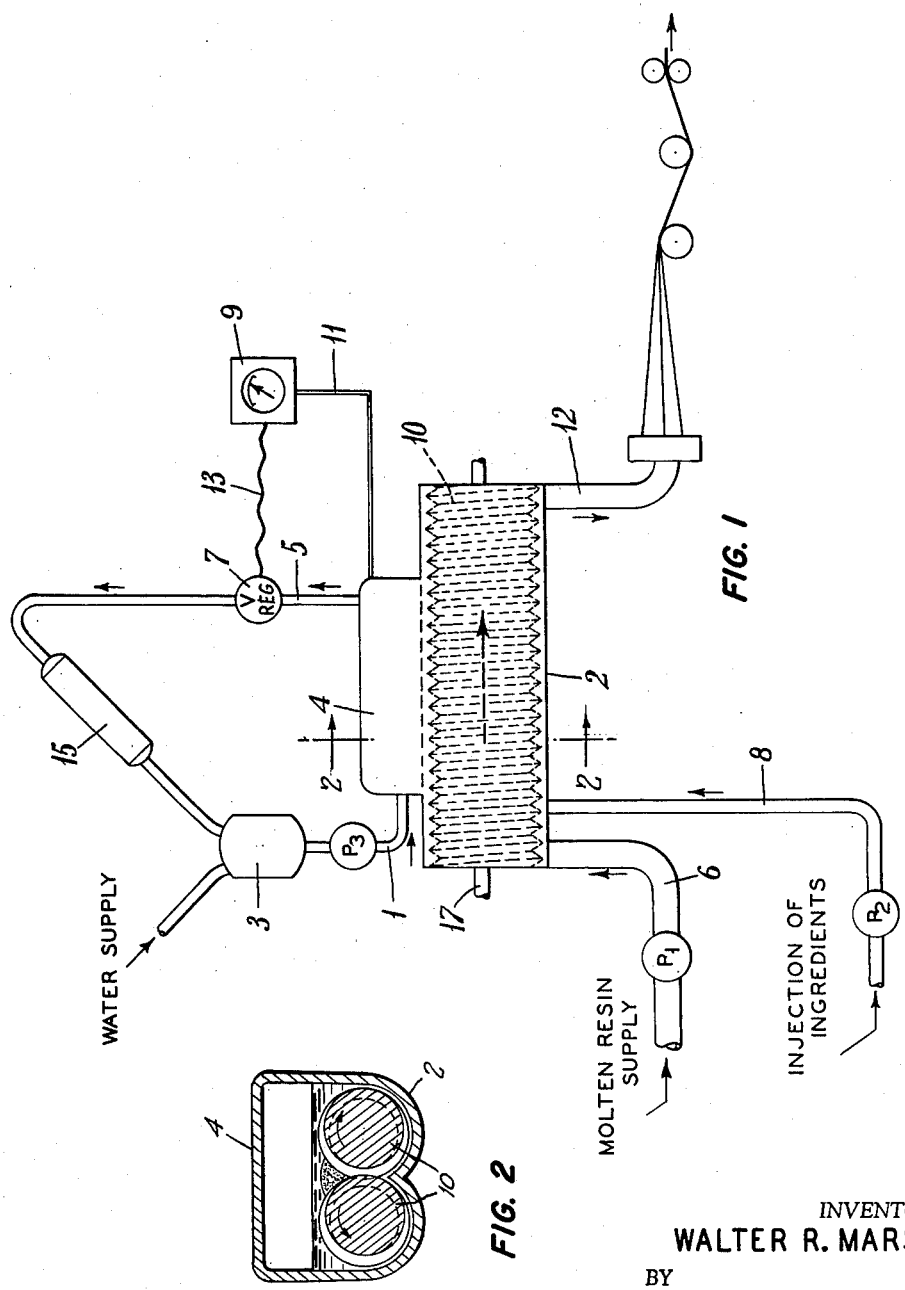
INVENTOR.
WALTER R. MARSHALL
BY
*James C. Arrantes*
ATTORNEY 3,063,091
METHOD AND APPARATUS FOR MILLING PLASTIC MATERIAL
Walter R. Marshall, Bloomfield, N.J., assignor to Union Carbide Corporation, a corporation of New York
Filed July 5, 1960, Ser. No. 40,780
10 Claims. (Cl. 18—2)

This invention relates to a method and apparatus for milling plastic material. More particularly, this invention relates to a method and apparatus for continuously milling plastic material under controlled temperatures whereby the plastic material being milled undergoes no chemical degradation and once so milled can be extruded, cast, or otherwise formed into shaped articles having improved physical properties.

Thermoplastic material is generally milled prior to being formed into shaped articles such as film, sheeting, and the like as the milling operation yields a material which is generally characterized by improved physical properties. As an illustration, milling thermoplastic material and then molding the milled material to form a shaped article prevents to a large extent surface deterioration of the shaped article. Surface deterioration is manifested by a frosty appearance which is due to the development and propagation of a large number of small, hairline surface cracks. These surface cracks grow in size and number as molded articles produced from unmilled thermoplastic material age. In addition to the surface deterioration described, initially transparent molded articles which are produced from unmilled thermoplastic material have been known to become opaque on aging.

Heretofore, milling of thermoplastic material has been accomplished, in general, by the use of two-roll mills, turn-screw mills, extruders, and Banbury mixers. In these and other comparable apparatus, milling has been accomplished by the development of shear in the thermoplastic material. Development of maximum shear in thermoplastic material can be more readily effected at relatively low temperatures wherein the thermoplastic material is at or only slightly above its melting point and the viscosity of the thermoplastic material is at a high value.

However, with known methods and apparatus for milling thermoplastic material, concurrently with the development therein of maximum shear, is the development of relatively high temperatures. These high temperatures not only bring about thermal degradation, oxidation, and other undesirable chemical changes in the thermoplastic material, but also bring about a decrease of viscosity. A decrease of viscosity decreases the amount of shear developed in the thermoplastic material as it is being milled, which, in turn, decreases the degree of milling, i.e., the amount of milling per pass through the mill, with the result that a plurality of passes have to be made in order to adequately mill the thermoplastic material. Thermoplastic material is considered to be adequately milled when shaped articles produced therefrom are relatively free of surface deterioration on aging and/or are relatively free of so-called "fish eyes." "Fish eyes" is a term commonly used to describe tiny lumps of plastic material, resembling fish eyes, which mar the appearance of shaped plastic material and degrade the physical properties thereof.

It is an object of this invention, therefore, to provide for the milling of plastic material under controlled temperatures, which can be varied practically instantaneously, so that maximum shear is developed and maintained in the plastic material without the occurrence therein of thermal degradation, oxidation, or other undesirable chemical changes and the plastic material so milled can be formed into shaped articles which are relatively free of so-called "fish eyes" and which are characterized by improved physical properties.

According to the present invention, plastic material is milled in an enclosed system, wherein the liquid vapor pressure can be varied as desired, while in contact with a boiling liquid which has a boiling point substantially corresponding to the melting point of the plastic material at the liquid vapor pressure under which the system is operating, the amount of boiling liquid in contact with the plastic material being such that the liquid extracts sufficient heat from the plastic material so that the temperature of the plastic material during the milling cycle is substantially equal to that of the boiling liquid with the result that maximum shear is developed and maintained in the plastic material.

The present invention is particularly desirable as the temperature at which the liquid boils and hence the temperature of the plastic material as it is being milled can be varied, as desired, practically instantaneously by appropriate control of the liquid vapor pressure under which the enclosed system is operating. By the present invention, plastic material is more adequately milled by a single pass through the enclosed milling system than previously possible and undergoes no undesirable chemical changes.

Referring now to the drawings, FIG. 1 represents a diagrammatic side elevation of one embodiment of an apparatus suitably employed in the practice of this invention. FIG. 2 represents a cross-sectional view of the apparatus of FIG. 1 taken along line 2—2. As shown in FIG. 1, plastic material is continuously pumped from a supply source (not shown) into an enclosed system comprising a two-roll mill 2 and dome 4, which is in communication with mill 2, through conduit 6 by means of pump $P_1$ and continuously milled in and then discharged from mill 2 through conduit 12.

The plastic material is generally fed into mill 2 in a molten state, that is, at a temperature in excess of its melting point but below the temperature at which thermal degradation occurs. If desired, however, the plastic material can be fed into mill 2 "cold." This is usually accomplished by feeding pellets of plastic material which are at room temperature into the mill. Pigments and other such ingredients can also be fed into mill 2, admixed and milled therein with the plastic material. These ingredients can be conveniently fed into mill 2 in a stream separate from that of the plastic material as for example is shown in the accompanying drawing wherein pigments and the like can be fed into mill 2 through conduit 8 by means of pump $P_2$ from a supply source (not shown).

The plastic material is milled in two-roll mill 2 by means of two counterrotating intermeshing threaded rolls 10 which also serve to convey the plastic material from the point of entry into mill 2 to and through discharge conduit 12. Actually the number of threaded rolls can vary so that mill 2 rather than housing two threaded rolls can house four or more. The threaded rolls, the size of which is not critical, can be horizontally mounted in mill 2 as shown in the drawing or mounted in a direction offset with respect to the horizontal. Also, the type of threads and the pitch of these threads is not critical. The threaded rolls, for example, can be of the type disclosed in U.S. 2,434,707. Roll 10 and its intermeshing counterpart (not shown) are driven by means of a timed gear drive (not shown) which drives each roll at the same revolutions per minute through shaft 17 and its counterpart (not shown). The timed gear drive is in turn driven by an appropriate fixed or variable speed driving means (not shown). The speed of rotation of the rolls will depend, in part, upon the type and amount of material which is being milled. Once milled and discharged from conduit 12, the plastic material can be processed in any desired manner, as for example extruded into monofilaments and formed into strands as shown in the drawing.

As the plastic material is being milled, liquid is fed into the enclosed system and into contact with the plastic material. Feeding liquid into contact with the plastic material can be conveniently carried out by pumping liquid from liquid supply source 3 by means of pump $P_3$ through conduit 1 and into dome 4 from whence the liquid falls down onto threaded rolls 10 and comes into contact with the plastic material which is being milled. Liquid can also be pumped into dome 4 through a series of spray jets mounted across dome 4 rather than using the arrangement depicted in the drawing. Using spray jets for introducing liquid into the enclosed system is generally preferred as by this means the liquid is more uniformly distributed in the system.

Dome 4 into which the liquid is initially introduced is in communication with two-roll mill 2 and generally parallel to the threaded worms mounted therein. The dome, however, can be of any convenient size and shape and, in fact, need not be parallel to the threaded rolls of the mill 2. The actual size and position of the dome will depend upon size, shape and mounting position of the overall system.

Any liquid can be generally used as the medium for extracting heat from the plastic material as long as its boiling point, at the liquid vapor pressure under which the enclosed system is operating, substantially corresponds to the melting point of the plastic material, that is, is in the range of from the melting point of the plastic material to about 25° C. in excess thereof. Usually the liquid used is immiscible, non-reactive, and non-deleterious with respect to the plastic material being milled. Liquids which are immiscible with respect to the plastic material are preferred as their boiling points, under the particular pressure which is being employed, can be accurately determined and such liquids can be easily removed or separated from the plastic material at the termination of the milling operation. Water is an exceptionally good "heat transfer" medium as it is immiscible, non-reactive, and non-deleterious with respect to a large number of plastic materials. Other suitable "heat transfer" liquids include ethyl alcohol, isopropanol, "Cellosolve," and the like.

The liquid is first introduced into the enclosed system and in contact with the plastic material when the temperature of the plastic material being milled, as determined by the temperature of the plastic material which is being discharged, is such as will cause the liquid in contact therewith to boil. The temperature at which the liquid will boil is controlled through the liquid vapor pressure under which the system is operating, as will be further explained subsequently.

In order to insure that the temperature of the plastic material in the mill does not fall below the melting point thereof which, if it did occur, would cause the plastic to solidify and interrupt the milling cycle, liquid is initially introduced into the system under relatively high liquid vapor pressures so that the liquid will boil at a temperature considerably in excess of the melting point of the plastic material, generally on the order of about 30° C. to about 50° C. in excess. When the amount of boiling liquid in contact with the plastic material is such that the liquid extracts sufficient heat from the plastic material so that the temperature of the plastic material is substantially equal to that of the boiling liquid, the liquid vapor pressure under which the system is operating is gradually decreased until the liquid boils at a temperature substantially corresponding to the melting point of the plastic, as previously explained, so that the plastic material is milled at maximum shear.

The temperature of the liquid which is introduced into the enclosed system is not critical. If the temperature of the liquid is below the temperature prevailing in the system, it will be heated to the "system" temperature. If the liquid is above the temperature of the system, it will be cooled to that temperature. When introducing liquid into the enclosed system at a temperature in excess of the temperature of the system, there will be some "flash-off" of liquid as vapor. This is corrected by introducing sufficient liquid into the system to compensate for the "flash-off."

The liquid vapor pressure under which the enclosed system operates is conveniently preset and controlled in the apparatus shown by means of a pressure regulating valve assembly composed of a pressure regulating valve 7 and pressure sensing means 9 which is connected to dome 4 through vapor pressure sensing line 11. Pressure sensing means 9 senses the liquid vapor pressure in dome 4, which is also the liquid vapor pressure under which the system is operating, and in response thereto operates through electrical connection 13 to open regulating valve 7 when the liquid vapor pressure in dome 4 exceeds the preset value and operates to close and/or to maintain regulating valve 7 closed when the liquid vapor pressure in dome 4 is at or below the preset value. When the liquid vapor pressure in dome 4 exceeds the preset value, sensing means 9 senses the actual pressure and operates through electrical connection 13 to open regulating valve 7 for a period of time such that sufficient liquid vapor escapes from dome 4 through conduit 5 to reduce the liquid vapor pressure in dome 4 to the preset and desired setting.

By a proper setting of the pressure regulating valve assembly, the temperature at which the liquid in the enclosed system boils and hence the temperature of the plastic material therein can be varied practically instantaneously, as desired.

Liquid vapor which passes through regulating valve 7 is condensed in condenser 15 which is mounted between regulating valve 7 and liquid supply tank 3 and in communication with each through conduit 5 and fed into liquid supply tank 3 as a liquid. The amount of liquid vapor recovered as a condensate can be determined by conventional means, for instance, by means of a rotameter (not shown) and an equal amount of liquid pumped from liquid supply tank 3 along with any additional liquid to make up for liquid losses through conduit 12, back into the system, thus maintaining the amount of liquid in contact with the plastic material substantially constant.

With the two-roll mill in operation, operating under the desired liquid vapor pressure and the amount of liquid in contact with the plastic material maintained substantially constant by continuously feeding into the system as much liquid as leaves the system and boiling at a temperature which is substantially equal to the melting point of the plastic material, the system is continuously operating and is in equilibrium. The plastic under the conditions described is being continuously milled under maximum shear. The plastic material so milled undergoes no undesirable thermal degradation or oxidation and once so milled is characterized by improved physical properties.

Among suitable plastics which can be milled in accordance with the present invention can be noted the thermoplastics, such as polyethylene, polypropylene, polyvinyl chloride, copolymers of vinyl chloride, such as a copolymer of vinyl chloride and vinyl acetate, polystyrene, copolymers of styrene, such as a copolymer of styrene and acrylonitrile, and the like.

The following example further illustrates the present invention and is not intended to limit the scope thereof.

*Example 1.—Polyethylene Milled Just Above the Melting Point*

Polyethylene having a density of 0.917, a melt index of 2.0 and a melting point of about 110° C. was milled in the equipment shown in the accompanying drawing.

The polyethylene was fed by means of a commercial 2-inch Hartig oil-heated extruder which metered, fused, and conveyed the polymer to a short, heated, ½-inch pipe leading into mill 2 which contained two intermeshing threaded rolls, with threaded sections of 4-inch pitch diameter by 12-inch length. The threads had a ¼-depth with about 1/32-inch clearance at the point of closest intermesh. The rolls were operated by a variable speed drive.

Polyethylene was processed through the mill at 27–28 pounds per hour. The extruder operated at 140° C.–150° C. at 32–33 r.p.m. After the polyethylene was satisfactorily processing, water at 85° C. was introduced into dome 4 of the mill, and the pressure release valve 7 connected thereto set at 20 p.s.i.g. Water was pumped in until the milling plastic was nearly submerged. The addition rate was reduced to a rate sufficient to hold that level of water for the balance of the milling operation. The hot plastic contacting the water produced steam, some of which vented from the system when the pressure in the dome exceeded the preset pressure on the valve. The valve setting was gradually reduced to 10 p.s.i.g. and then to 5 p.s.i.g. At this pressure water boiled at about 110° C. The temperature of the plastic discharging from the mill practically as a solid rod was 114° C., barely above the melting temperature of the plastic. The electric load on the variable speed drive was 4350 watts.

Although the feed resin before milling was not commercially acceptable as regard to "fish eye" content when made into thin film, the resin milled as described showed an excellent "fish eye" rating, above the normally accepted commercial grade. The "fish eyes" had been successfully reduced and dispersed.

In order to demonstrate that for successfully and continuously milling plastic material the liquid in contact therewith has to boil at a temperature which is substantially equal to the melting point temperature of the plastic, the operations of Example 1 were repeated with the exception that the pressure relief valve was reset down to 2 p.s.i.g. At this pressure water had a boiling point of about 102° C. This change almost immediately upset the milling equilibrium. The plastic material on the threaded rolls solidified, stripped off, piled up in the dome of the mill, and floated on top of the water.

Essentially the same milling operation as that described in Example 1 was also performed with the following exceptions. No water was pumped into the mill; the milling was conducted under atmospheric pressure and the threaded rolls were operated at 60 r.p.m.; the load on the variable speed drive was only 3800 watts, indicating that the polyethylene had a substantially lower viscosity than the polyethylene being milled under conditions described in Example 1. The polyethylene was being discharged from the mill at a temperature of 170° C. Operating the threaded rolls at 50 r.p.m. and with 26.5 inches of vacuum applied to the dome of the mill, the power input dropped to 3000 watts. Under these conditions, the polyethylene exit temperature was 180° C., again confirming the cooling control effected by water as in Example 1. "Fish eye" content of film made from the polyethylene processed as described above was not appreciably affected by milling under these conditions and was still below commercially acceptable standards.

The film, in all instances, was produced by extruding the polyethylene into film in the order of 4–5 mils.

What is claimed is:

1. Method for milling plastic material which comprises milling a plastic material under the surface of and in intimate contact with a liquid which is boiling at a temperature which is in the range of from the melting point of the plastic material to about 25° C. in excess thereof. The amount of boiling liquid in contact with the said plastic material being such that the liquid extracts sufficient heat therefrom so that the temperature of the plastic material is substantially equal to that of the boiling liquid.

2. Method as defined in claim 1 wherein the plastic material is polyethylene.

3. Method as defined in claim 1 wherein the liquid is water.

4. Method as defined in claim 1 wherein the liquid is immiscible with respect to the plastic material.

5. Method for milling plastic material which comprises feeding plastic material into an enclosed area, contacting said plastic material therein with a boiling liquid, maintaining the liquid vapor pressure in said enclosed area at a value such that the liquid boils at a temperature which is in the range of from the melting point of the plastic material to about 25° C. in excess thereof and milling said plastic material while in contact with said boiling liquid, the amount of boiling liquid in contact with the plastic material being such that the liquid extracts sufficient heat therefrom so that the temperature of the plastic material during the milling cycle is substantially equal to that of the boiling liquid.

6. Method for milling plastic material which comprises feeding plastic material into an enclosed area, contacting said plastic material therein with a boiling liquid, maintaining the liquid vapor pressure in said enclosed area at a value such that the said liquid boils at a temperature of from about 30° C. to about 50° C. in excess of the melting point of said plastic, increasing the amount of said liquid in contact with said plastic material until the amount of liquid is such that the liquid extracts sufficient heat from the plastic material so that the temperature of the plastic material during the milling cycle is substantially equal to that of the boiling liquid and while so increasing the amount of liquid fed into the enclosed system, reducing the liquid vapor pressure of the said system until the liquid boils at a temperature which is in the range of from the melting point of the plastic material to about 25° C. in excess thereof and milling said plastic under the conditions recited.

7. An apparatus for milling plastic material comprising a mill into which plastic material is fed, in which said material is milled and from which the milled material is charged, a dome in communication with said mill, means to feed liquid into said contact with said plastic material through said dome and means to vary the liquid vapor pressure in said dome so that the liquid in contact with said plastic material boils at the desired temperature during the milling cycle.

8. An apparatus for milling plastic material comprising a mill into which plastic materal is fed, in which said material is milled and from which the milled material is discharged, a dome in communication with said mill, means to feed liquid into contact with said plastic material through said dome, a pressure regulating valve assembly connected to said dome composed of pressure sensing means and pressure regulating valve for sensing and regulating the liquid vapor pressure in said dome so that the said liquid in contact with said plastic material boils at the desired temperature during the milling cycle, said pressure sensing means operating to open said regulating valve when the liquid vapor pressure in said dome exceeds the preset value and operating to close said regulating valve when the said vapor pressure does not exceed the preset value.

9. An apparatus for milling plastic material comprising a mill into which plastic material is fed, in which said plastic material is milled and from which the milled material is discharged, a dome in communication with said mill, means to feed liquid into contact with said plastic material through said dome, a pressure regulating valve assembly connected to said dome composed of pressure sensing means and pressure regulating valve for sensing and regulating the liquid vapor pressure in said dome so that the liquid in contact with said plastic material boils at the desired temperature during the milling cycle, said pressure sensing means operating to close and to maintain the said regulating valve closed when the vapor pressure in said dome does not exceed the preset value and operating to open said regulating valve when the liquid vapor pressure in said dome exceeds the preset value for a period of time such that a sufficient amount of liquid vapor escapes from said dome to reduce the liquid vapor pressure to the preset value and means to continuously return to the system as much liquid as leaves the system thereby keeping the amount of liquid in contact with the plastic material substantially constant.

10. Method for milling plastic material which comprises feeding plastic material into an enclosed area, contacting said plastic material therein with boiling water, maintaining the pressure in said enclosed area at a value such that the water boils at a temperature which is in the range of from the melting point of the plastic material to about 25° C. in excess thereof, and milling said plastic material while in contact with said boiling water while maintaining the amount of liquid water in contact with the plastic material substantially constant by feeding into the system as much water as that which leaves the system, the amount of water in contact with the plastic material being such that the water extracts sufficient heat therefrom so that the temperature of the plastic during the milling cycle is substantially equal to that of the boiling water.

References Cited in the file of this patent
UNITED STATES PATENTS

| | | |
|---|---|---|
| 2,561,043 | Ayers | July 17, 1951 |
| 2,565,420 | Ayers | Aug. 21, 1951 |
| 2,615,199 | Fuller | Oct. 28, 1952 |